United States Patent [19]
Jackson et al.

[11] 4,247,922
[45] Jan. 27, 1981

[54] OBJECT POSITION AND CONDITION DETECTION SYSTEM

[75] Inventors: Dale H. Jackson, Plattsburgh, N.Y.; Robert R. Murray, Ledyard, Conn.

[73] Assignee: Harris Corporation, Melbourne, Fla.

[21] Appl. No.: 950,676

[22] Filed: Oct. 12, 1978

[51] Int. Cl.³ .............................................. H04B 1/59
[52] U.S. Cl. ..................................... 367/6; 367/128; 343/112D
[58] Field of Search ........ 340/3 E; 343/5 BD, 112 D; 367/2, 6, 117, 128

[56] References Cited

U.S. PATENT DOCUMENTS

| | | | |
|---|---|---|---|
| 3,076,519 | 2/1963 | Alsabrook | 367/2 |
| 3,098,992 | 7/1963 | Rath | 367/6 |
| 4,055,830 | 10/1977 | Wilson et al. | 343/112 D |

FOREIGN PATENT DOCUMENTS 1439055  6/1976  United Kingdom .................... 340/3 E

*Primary Examiner*—Richard A. Farley

[57] ABSTRACT

A lift truck (16) carries a leftwardly directed ultrasonic receiver (32L) and a rightwardly directed ultrasonic receiver (32R) and an RF transmitter (34). Upon depositing its load in an assigned bin in a warehouse (FIG. 1), a load sensor (22) is actuated to cause transmission of a coded signal as to lift height and vehicle identification to a central station (60). This initiates a vehicle search by energizing ultrasonic transmitters (42-52). The ultrasonic receivers (32L and 32R) on a vehicle in a path under surveillance detect the sonic signal and relay this to the central station by way of the RF transmitter (34). The time duration which elapsed from energization of the ultrasonic transmitter to detection of the sonic signal is used to measure vehicle path depth and a comparison of the magnitudes of the sonic signals received by the receivers (32L and 32R) indicates the heading direction of the vehicle.

13 Claims, 7 Drawing Figures

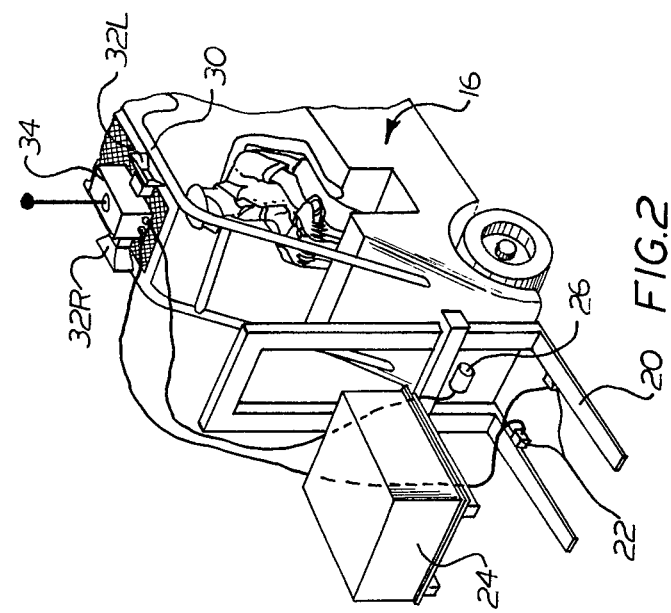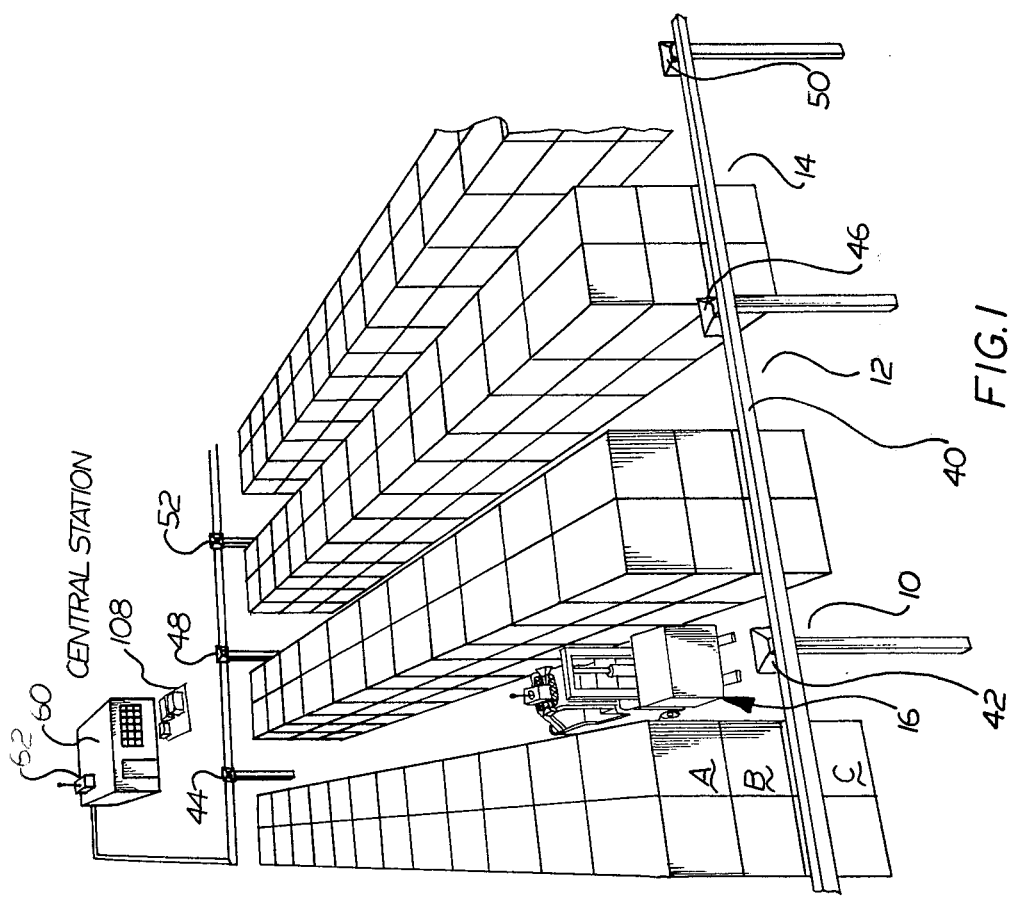

OBJECT POSITION AND CONDITION DETECTION SYSTEM

BACKGROUND AND FIELD OF THE INVENTION

The present invention relates to the art of detecting movable objects such as vehicles and the like, and, more particularly to a system wherein the position and the vehicle condition are determined.

Whereas the invention has particular application for use in detecting the position and condition, such as heading direction, of a forklift truck or the like in a warehouse type environment, and will be described with respect to the same, the invention may be used in other applications wherein location and condition of a movable object is desired.

One of the problems encountered in a printing-binding warehouse situation deals with lost or misplaced goods. Such goods, for example, may take the form of bundles of papers, generally referred to as signatures, located on warehouse skids. Such warehouse skids, with the goods thereon, are stored in bins located on the left and right sides of various aisles. In a printing application, misplaced or lost skids with the goods thereon may result in a costly press run to replace the missing material. Although such warehouses may incorporate computerized inventory systems, such systems merely allocate suitable storage locations or bins for the various skids. Thereafter, a forklift truck operator will retrieve a skid and then proceed to the assigned bin location and deposit the skid therein. Such a computerized inventory system has no check on whether the operator inadvertently or otherwise placed the skid in the wrong bin. The suggested answers to this problem have required relatively complex special machinery and special warehouse construction and, hence, high capital expense. There is a need to solve the problem without resort to such expense.

SUMMARY OF THE INVENTION

As applied to such a warehouse system, the present invention contemplates sensing an event indcative that the venicle has deposited its load in one of the bin locations. This triggers a search to find the vehicle to determine vehicle aisle location, depth of penetration therein, and whether the vehicle is facing the left bins or the right bins. This information together with information indicating the height of the lift at the time of depositing the load will indicate whether the vehicle deposited the load in the proper storage location.

It is therefore an object of the present invention to determine whether goods have been placed in assigned storage locations in a warehouse or the like by noting the location and condition (direction and lift height) of a fork lift truck at the time it deposited its load in a storage facility.

It is another object of the present invention to transmit an energy beam along a path containing a vehicle which, in turn, transmits information to another location at which a determination can be made as to vehicle's location and its heading direction within the path.

It is a still further object of the present invention that transmission of such an energy beam along a vehicle path take place in response to a vehicle, in the path, transmitting a coded signal at the time that the vehicle deposits its load in a storage location.

It is still a further object of the present invention that, in the case of a forklift truck or the like, a lift height sensor provide coded information for transmission to the central station indicative of the lift height at the time the load was deposited into a storage location.

It is still a further object of the present invention that the load carrying vehicle be equipped with an RF transmitter which is actuated upon detection of such an energy beam and that a central station be provided with equipment for receiving the beam for determining the vehicle's position within an aisle by noting the time duration which has taken place from energization of the beam to receipt of a signal from the vehicle indicating it has received the beam.

To achieve the foregoing and other objectives the invention is directed to a system for detecting the path position of a load carrying vehicle adapted to travel along a path and deposit its load at an assigned location. The vehicle carries facilities for transmitting a first signal to a central station indicative that the load has been removed. This causes actuation of equipment at the central station to initiate a vehicle search by transmitting an energy beam along the path. The beam is detected by a receiver on the vehicle, causing transmission of a second signal to the central station. At the central station, equipment utilizes the first and second signals for determining the path position of the vehicle.

In accordance with another aspect of the invention, the vehicle transmits a third signal also in response to detection of the energy beam. The equipment at the central station compares the second and third signals to determine heading direction of the vehicle.

In accordance with a still further and more limited aspect of the invention as applied to lift truck vehicles, the first signal includes information indicative of the lift height at the time the load was removed from the lift.

BRIEF DESCRIPTION OF THE DRAWINGS

The foregoing and other objects and advantages of the present invention will become more readily apparent from the following detailed description, as taken in conjunction with the accompanying drawings, which are a part hereof and wherein:

FIG. 1 is a schematic illustration of a printing-binding warehouse application of the invention;

FIG. 2 is a schematic illustration of a forklift truck which may carry equipment used in practicing the invention;

DETAILED DESCRIPTION

Figure 3:
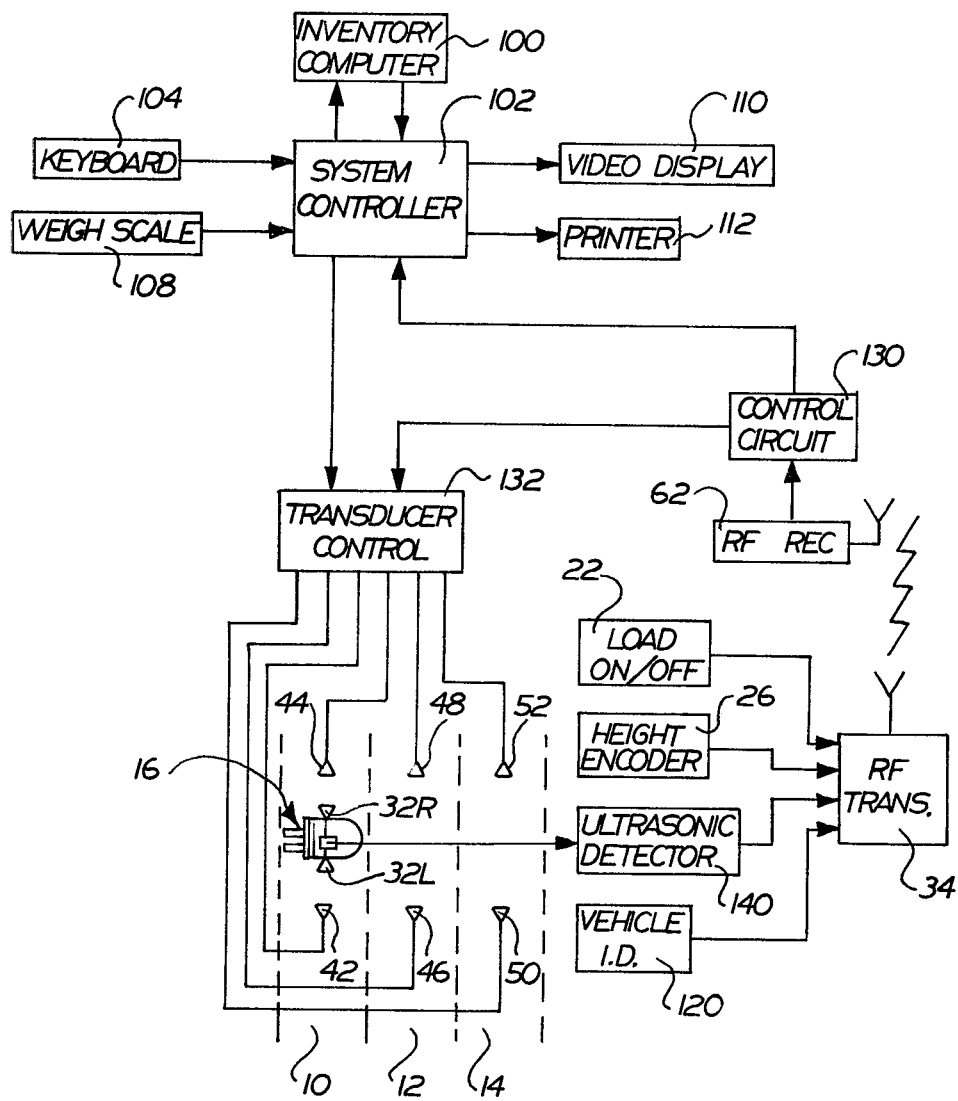
FIG. 3 is a schematic-block diagram illustration of equipment employed in practicing one embodiment of the invention.

Although the preferred embodiment of the present invention will be described hereinafter in conjunction with a printing-binding warehouse application, it is to be appreciated that the invention may be applied in various situations requiring position information of a vehicle, such as a lift truck in a warehouse environment.

Referring now to the drawings, FIG. 1 is a schematic illustration of a portion of a warehouse, such as a printing-binding warehouse. As shown there, the warehouse includes several aisles, such as the aisles 10, 12 and 14, each of which extends between left and right storage bin locations. Shown, for example with respect to aisle 10, are storage bins that may be three or more levels such as lower level C, middle level B and upper level A, aligned along both the left and right sides of the aisle. A typical aisle may have twelve storage bin locations, each having three levels A, B, and C on both the left and right sides. The length of an aisle may be on the order of 100 ft. or more, depending on the size of the warehouse. There is sufficient width in each aisle to accommodate a forklift truck, such as the truck 16. The truck may traverse back and forth along the aisle and will turn to the left to insert a load into a storage bin location on the left side of the aisle or turn to the right to insert a load into a storage bin location on the right side of the aisle. It is contemplated that each forklift truck will be operator controlled in a fashion well known in the art.

Whereas the forklift truck may take various forms known in the art, it is contemplated that it will be equipped with a conventional lift mechanism 20, as is indicated in FIG. 2. Suitable load sensors 22 are mounted by any convenient means to the lift 20. These load sensors are conventional in the art and will serve to provide an output signal whenever the load 24 has been removed, as by the operator depositing the load in a suitable storage bin. Additionally, a height encoder 26 is suitably mounted on the lift so as to provide an output signal indicative of the height of the lift so that this information may be available when the operator deposits a load. The height encoder may take various forms well known in the art. Additionally, the lift truck 16 is provided with a roof 30 of a structure sufficient to permit installation of a pair of ultrasonic receivers 32L and 32R. These respectively serve as the left sonic receiver and the right sonic receiver. The roof 30 will also carry a radio frequency transmitter 34. The load sensor, height encoder, ultrasonic receivers and the RF transmitter will be discussed in greater detail hereinafter.

Referring again to FIG. 1 it will be noted that at the end of each aisle a supporting structure is provided which carries an ultrasonic transmitter. Thus, with respect to aisle 10, a support structure 40 carries oppositely located ultrasonic transmitters 42 and 44. Each is separately activated and at different times as will be described in greater detail hereinafter. The beam transmitted from one of these transmitters is sufficient to radiate along the length of an aisle from one end to the other with sufficient directivity so as to be intercepted by either the left sonic receiver 32L or the right sonic receiver 32R. Similarly, structure 40 also carries ultrasonic transmitters 46 and 48 at opposite ends of aisle 12 and transmitters 50 and 52 at opposite ends of aisle 14. The ultrasonic transmitters are all controlled and energized by equipment, to be discussed hereinafter, located at a central station 60. The central station will also include an RF receiver 62 for receiving radio frequency signals from an RF transmitter 34 on a forklift truck.

Referring now to FIG. 3, there is provided a schematic illustration of the circuitry which may be employed in practicing the invention as applied to a printing-binding warehouse environment of the nature shown in FIG. 1. If the warehouse is provided with an inventory computer, such as computer 100, then it is contemplated that a system controller 102 utilized with the invention may be made interactive with the inventory computer for such uses as periodically updating total warehouse inventory files. The system controller, in itself, may take the form of a conventional mini-computer which is programmed so as to be interactive with the inventory computer 100 as well as to provide the various control functions to be described in detail hereinafter. Input peripherals to the system controller 100 may include a keyboard 104 for inputting requisition data and the like and a weigh scale sensor 108 which may input data representative of when a load has been removed from the central station. Output peripherals may include a typical video display 110 as well as a hard copy printer 112 which may be used for providing forklift operators with instructions as to where goods are to be deposited for storage in the warehouse.

In a typical sequence of operations, a load such printed sheets of paper, known as signatures, is brought to the central station and placed on the scale 108. The scale may be used to determine the load weight, including that of the skid. The number of signatures as well as the type of signatures involved may be entered into the computer by the operator, as by way of the keyboard 104. The system controller 102 may then be used to provide command information indicating assignment of the storage location for the load at issue. Commands may be given to the forklift operator by way of the video display 110 as well as by a hard copy readout provided by printer 112. If a printout is provided, it would preferably include information identifying the load and the storage location for the forklift operator. Whereas it is preferred that the invention be used in conjunction with such a system controller, it is not necessary as command information for the lift truck operator may be provided by other means, such as manually. However, by using a minicomputer for a system controller 102 the computer may be programmed so that it is informed when a load has been moved from the weigh scale by transmission of a signal from the forklift truck to the computer by way of the RF link. This, for example, may be done by employing the on/off switch 22 on the forklift truck to activate the RF transmitter 34 so that it transmits vehicle identification data which may be obtained as from a vehicle identification source 120. Optionally, this information may be put into the computer by way of the keyboard 104.

It is contemplated that a forklift truck operator will respond to received instructions as to assignment of a particular load of signatures to a particular storage bin and will traverse down one of the aisle within the warehouse. He will turn the lift truck to face to the left bins or to the right bins to facilitate unloading of the goods. As the goods are being unloaded, this event will be noted by the load sensors 22 which respond to a load-off condition and provide an output signal indicative thereof. As will be brought in greater detail hereinafter, this will trigger an RF radio transmission to the central station by way of the RF transmitter 34. Receiver 62 at the central station will respond to this communication and, by way of suitable control circuitry 130, will activate a tranducer control 132 to energize search transducers to find the vehicle location. The search tranducers to be described hereinafter preferably emit ultransonic pulses at a frequency on the order of 25 KHz.

Other forms of vehicle tracking may be employed, for example, light beams, including laser beams, and radar.

Under the control of the tranducer control 132, a selected one of the various ultrasonic transducers will be energized to emit an energy beam along the aisle to which transducer is directed. The transducers may be energized one at a time in sequence until a lift truck is detected in one of the aisles. In the example illustrated in FIGS. 1 and 3, the sequence may commence, for example, by energizing the ultrasonic transmitter 42, then transmitter 46 and so on. If a vehicle is located in an aisle within the energy beam, that beam will be detected by one of the ultrasonic receivers 32L and 32R carried by the lift truck. This will be noted by the ultrasonic detector circuitry 140 associated with the ultrasonic receiver and will cause transmission of a signal by an Rf transmitter 34 which is related to the amplitude of the received sonic signal. This will be received by the receiver 62 at the central station. One implementation of this RF transmission as well as the transmission of data respecting the condition of the load on/off switch and the forklift level will be described in greater detail hereinafter with reference to the remaining figures.

The level of the lift, obtained from the height encoder 26, will provide data indicative of which bin level A, B or C the load was deposited in at the time the load on/off switch 22 was actuated, indicative of a load off condition. The vehicle identification information confirms the vehicle identity. The time duration between transmission and then detection of the ultrasonic signal is used to determine the aisle depth at which the truck is located at the time the load was deposited in a bin. Analysis of the signal strength of the ultrasonic signals received by the left receiver 32L and the right ultrasonic receiver 32R will indicate the heading direction of the forklift truck as it deposited its load on the left side of the aisle or the right side of the aisle (as viewed in FIGS. 1 and 3). Thus the information obtained will provide aisle number, aisle depth, left or right side of the aisle and load height at the time the load was deposited. This is feedback information as to whether the operator deposited the goods in the proper location. This data may be supplied to the system controller 102 for confirmation, as well as for updating the inventory computer 100.

Having now generally described the application of the invention as depicted in FIGS. 1, 2 and 3, reference is made to the more detailed schematic-block diagram illustrations in FIGS. 4 to 7 for a specific implementation of the manner in which the electronic circuits may be employed. Whereas the vehicle tracking system may take forms other than ultrasonic, it has been found that ultrasonic transmissions having frequencies on the order of 25 Khz will suffice. The transmitters and receivers employed may be conventional in the art and, for example, may take the form of conventional piezoelectric ultrasonic transducers.

Figure 4:
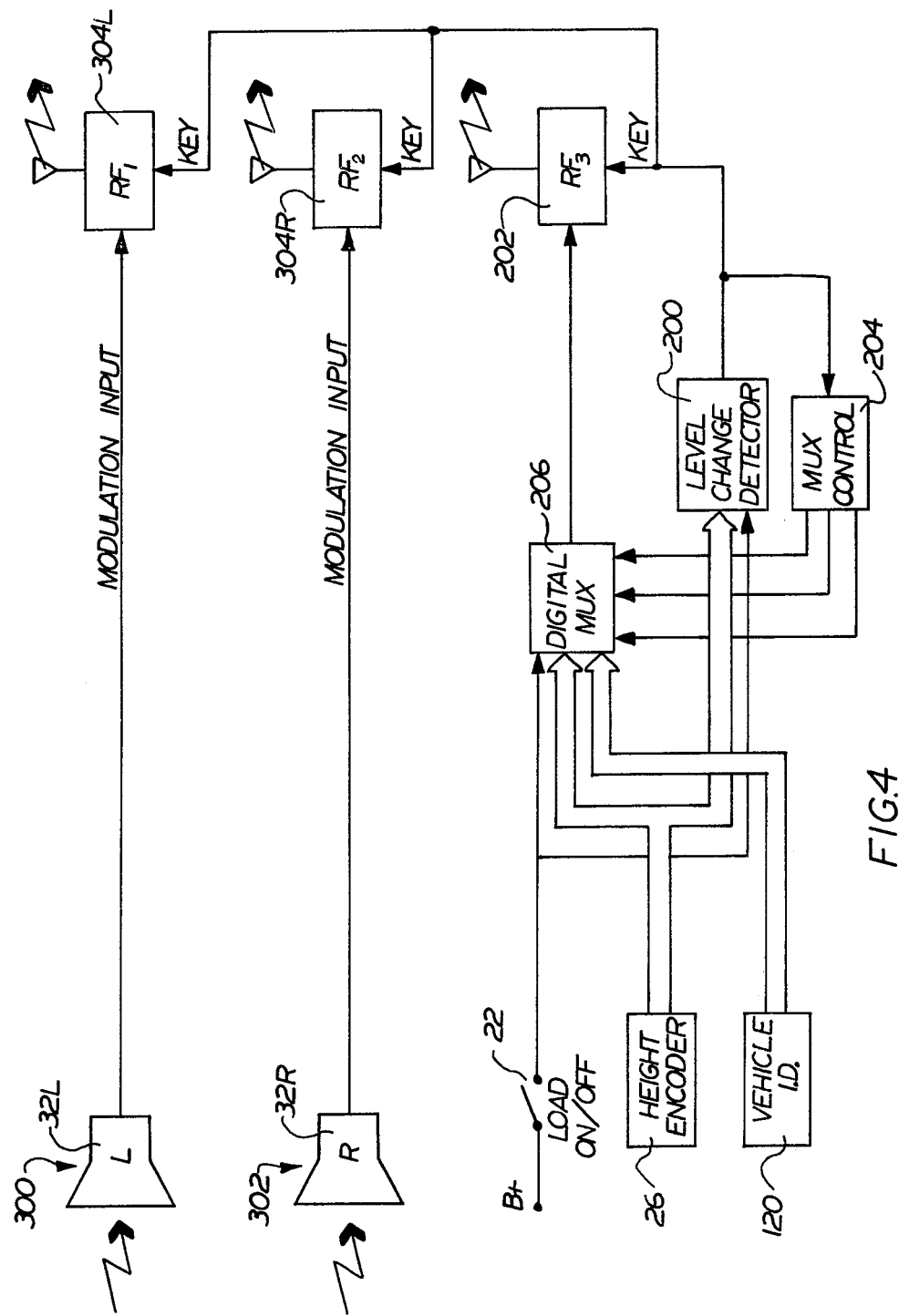
FIG. 4 is a schematic illustration of circuitry which may be carried by the vehicle in FIG. 2.

Reference is now made to FIG. 4 which provides a detailed implementation of the electronics provided for installation on a vehicle, such as the forklift truck 16 of FIGS. 1 and 3. Actuation of the load on/off switch 22 or a change in the output obtained from the height encoder 26 will be detected by a digital signal level change detector 200. These events will take place, for example, upon the operator manipulating the forklift truck 16 so as to deposit a load in a storage bin. Since information as to load on or off and lift height level are of concern, this data should be transmitted to the central station. Consequently, upon such a detection by the level change detector 200, the circuit will produce an output which will serve to key a suitable RF transmitter 202. This will provide transmission of an RF signal at a carrier frequency, which we may consider $F_3$. The carrier will be modulated in a known manner by digital information representative of the vehicle identification, as obtained from the vehicle identification source 120 (and this may take the form of conventional digital thumbwheel selector or the like), the level of the lift from the height encoder 26 and the condition of the on/off switch 22. At the time of keying the RF transmitter 202, the output from the level change detector 200 will also actuate a multiplexer control circuit 204, which may take the form of a three position counter together with a suitable clock source, for the purposes of sequentially gating AND gates located in a digital multiplexer 206 to pass in sequence the digital data taken from the on/off switch 22, the height encoder 26 and the vehicle identification source 120. This transmission pattern should be in sequence, with the order being selected by the user or as desired. Also the transmission may be repeated a number of times as desired. The RF transmitter 202 may be conventional in the art and, preferably, should include circuitry so than on being keyed by the level change detector 202, a carrier frequency is transmitted. The circuitry should include digital conversion circuitry for receiving the digital information and appropriately modulating the carrier signal for transmission of the digital data. The receiver equipment at the central station will be discussed hereinafter with reference to the FIGS. 5, 6 and 7.

Referring again to FIG. 4, there is illustrated one manner of implementing the circuitry for receiving ultrasonic signals from a transmitter and supplying RF transmission indicative thereof. As shown in FIG. 4, two channels are provided including a left channel 300 and right channel 302. The circuits may be identical and could be implemented in different ways such as with a time sharing multiplexing system. As shown in FIG. 4 each channel includes ultrasonic receiver such as the left receiver 32L and the right receiver 32R. Considering the left channel 300, the 25 KHz sonic signal received by the ultrasonic receiver 32L is supplied as a modulation input to an RF amplifier 304. In this version the modulation input will be used to amplitude modulate the carrier wave operating at a carrier frequency $F_1$ supplied by the RF transmitter 304. The transmitter was keyed for a sufficient duration to accomplish this function by the output of the level change detector 200. The right channel operates in the same manner and differs therefrom only in that its transmitter 304R transmitts a different carrier frequency $F_2$ so that the signal may be distinguished from that supplied by RF transmitter 304L.

Figure 5:
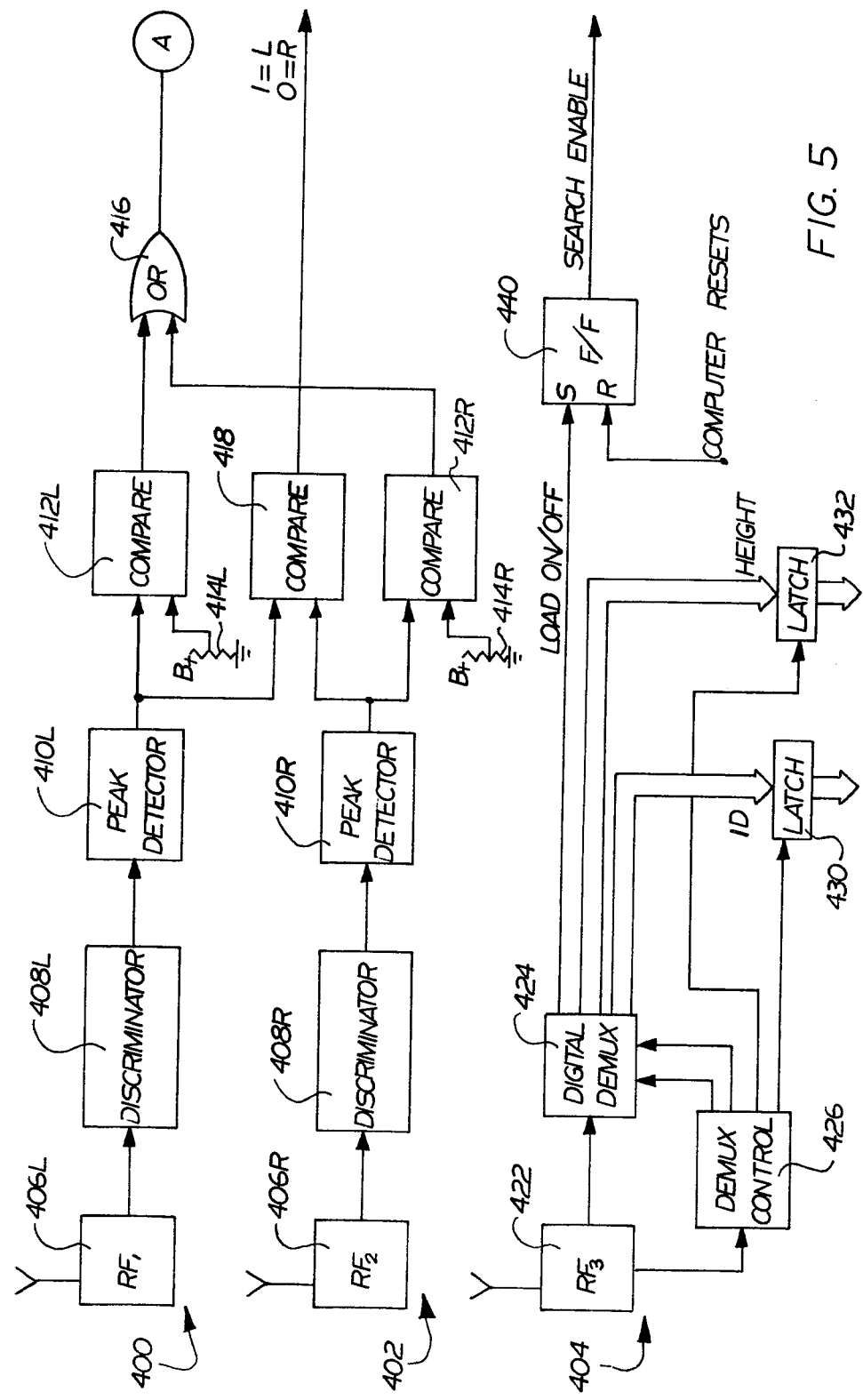
FIG. 5 is a schematic illustration of circuitry employed at the central station receiver.

Reference is now made to FIG. 5 which shows one implementation of circuitry for receiving signals transmitted from the three channels of the RF transmitter 34 carried by a forklift truck. The RF receiver 62 may be considered as having three receiving channels 400, 402 and 404 for respectively receiving the three carrier frequencies $F_1$, $F_2$ and $F_3$. Channels 400 and 402 are essentially the same and reference will now be made to channel 400. This channel includes an RF receiver 406 which is responsive to the carrier frequency $F_1$ transmitted by the RF transmitter 304L. The carrier wave is demodulated and the sonic frequency signal at 25 KHz is passed by way of a discriminator circuit 408L to a peak detector 410L. The amplitude of the output signal obtained from the peak detector is representative of the magnitude or "loudness" of the sonic signal. This is supplied to a comparator circuit 412L which determines whether the amplitude is greater than some threshold level as obtained from a potentiometer 414L and, if so, the output signal is supplied by way of an OR gate 416.

In a similar manner channel 402 includes a receiver 406R for receiving the carrier frequency $F_3$ transmitted by the right transmitter 304R and the carrier frequency is demodulated and the output is passed through a discriminator 408R to a peak detector 410R so that the output of the peak detector is of a magnitude representative of the amplitude or "loudness" of the sonic signal received by receiver 32R. Again, this output is compared by means of a comparator 412R with a threshold obtained from a potentiometer 414R and if this magnitude is sufficiently high an output signal is passed by the OR gate 416.

The amplitudes of of the signals provided by peak detectors 410L and 410R are compared by means of a comparator 418 to determine which is of the greater value (indicative of which receiver 32L or 32R received the "louder" sonic signal). The output of comparator 418 may be a high signal or binary "1" signal if the greater signal is from the left channel and if not an output signal will be low or a binary "0" signal. This information is used in determining whether the vehicle was facing to the left or to the right when it deposited a load in one of the bins in the warehouse. In the example of FIG. 3 the vehicle has turned to the left to deposit the load of goods. If transducer 42 is energized, then the stronger or "loudest" sonic signal received by the receivers 32L and 32R should be that at receiver 32L. The other receiver 32R will receive some of the sonic signal, but because of the directivity of its receiver, this should be of a much lower volume. By comparing the two signals with circuitry, such as that shown in FIG. 5, information may be relayed to the computer as to whether the vehicle was directed to the left or to the right at the time the goods were deposited in the storage bin.

The digital information received by channel 404 is received by a radio frequency receiver 422 and the digital information is obtained from the output signal thereof by means of a digital multiplexer 424. This is under the control of a demultiplexer control 426 (such as an oscillator and a counter) to provide the output digital information. The vehicle identification data may be loaded into a suitable latch circuit 430 and the vehicle height information may be latched into other latch circuit 432, both of which are loaded under control of the demultiplexer control 426. The load on/off information will have an output signal of a binary "1" level when the load is off indicating that the load has been deposited in a bin. This event is used to trigger a search operation by energization of the sonic transducers. This may be initiated by using the off signal to set a flip-flop 440. This is to enable an AND gate 442 illustrated in FIG. 6.

Figure 6:
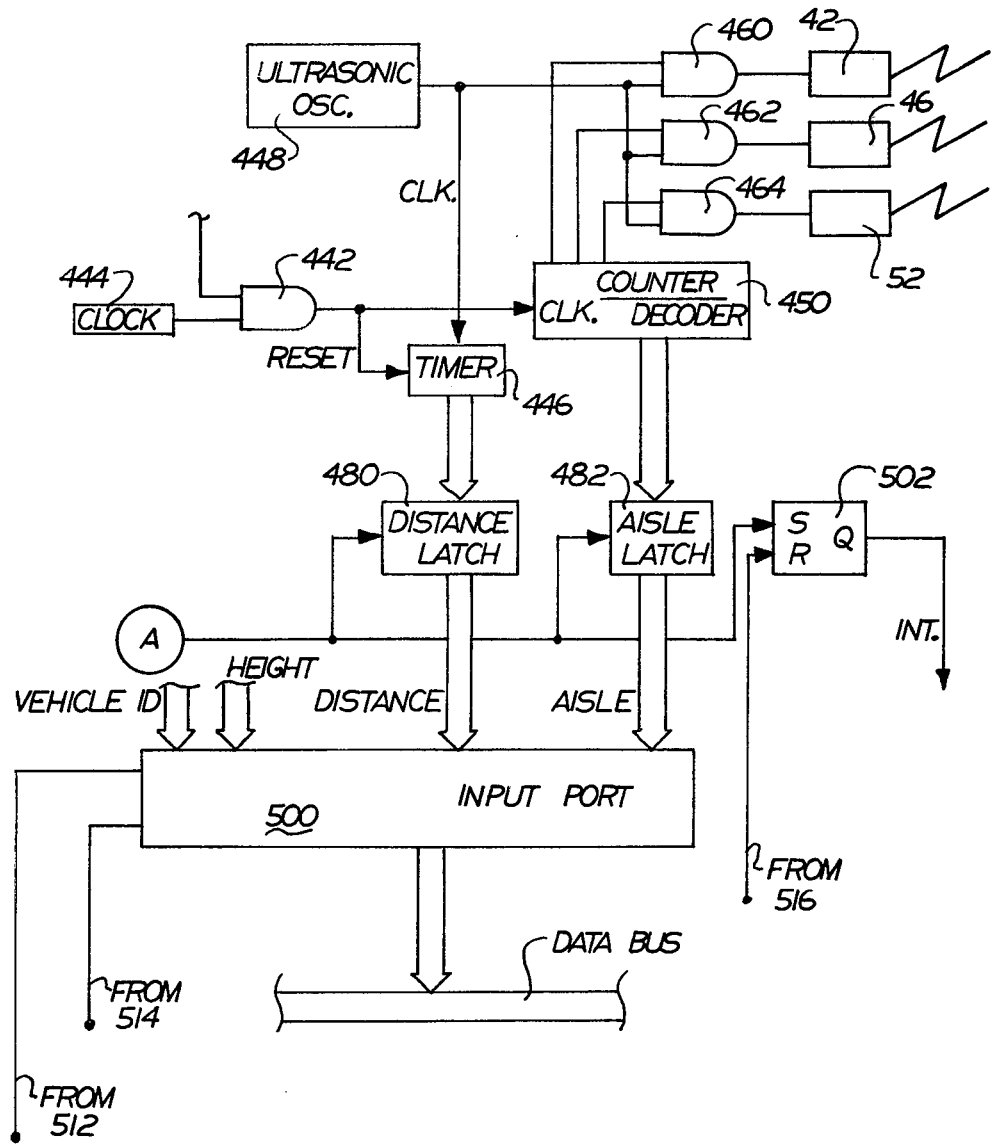
FIG. 6 is a schematic illustration of circuitry which may be employed at the central station for u~~ in controlling ultrasonic transmitters and for obtaining position data.

Referring now to FIG. 6 the search enable output of flip-flop 440 serves to enable AND gate 442 to pass a relatively slow clock pulse from a change aisle clock source 444. After gate 442 is enabled, the next clock pulse from clock 444 will be passed and will be applied as a reset input to the timer circuit 446. The timer will now commence timing a relatively fast clock source in the form of an ultrasonic oscillator 448. The reset pulse supplied to the timer 446 is also supplied to the clock input of a counter decoder 450 which serves to select which aisle and transducer in that aisle is to be energized. For example, on a first count of the clock passed by gate 442, the counter will enable and AND gate 460 so as to pass signals from the ultrasonic oscillator 448 to energize the ultrasonic transmitter 42. On the next aisle count, AND gate 462 is enabled to pass the ultransonic oscillator signal pulses to energize the next succeeding ultransonic transmitter 46. This will be continued in the sequence of the transmitters shown in FIG. 3 with the last count enabling an AND gate 464 to supply oscillator pulses to the last ultrasonic transmitter in the sequence, such as transmitter 52. Consequently, the count provided by counter 450 will also provide information as to which aisle is under surveillance.

The time duration between successive pulses from the change aisle clock 444 is established to be substantially longer than longest anticipated time duration which would take place between actuation of the on/off switch 22 and detection of a sonic signal as registered at the central station. Actuation of switch 22 initiates transmission of digital data to the central station and which, in turn, activates the ultrasonic transducer control circuitry so that one of the transducers, such as 42 will be energized. At that point an output is obtained from OR gate 416 (FIG. 5) which is used as a load signal to a distance latch register 480 and a companion aisle latch register 482. These will then take the then existing readings from timer 446 and counter decoder 450 respectively. The status of the count in the aisle latch register will be representative of the aisle under surveillance and the status of the distance latch register 480 will be indicative of the distance from the transmitter to the receiver on the vehicle in the aisle and, hence, this provides a measure of aisle depth. This follows since the frequency of the ultrasonic oscillator 448 is a known value and the propagation rate of the sound waves is a known value. The frequency count in the timer 446 is directly related to the distance from the transmitter to the lift truck.

Figure 7:
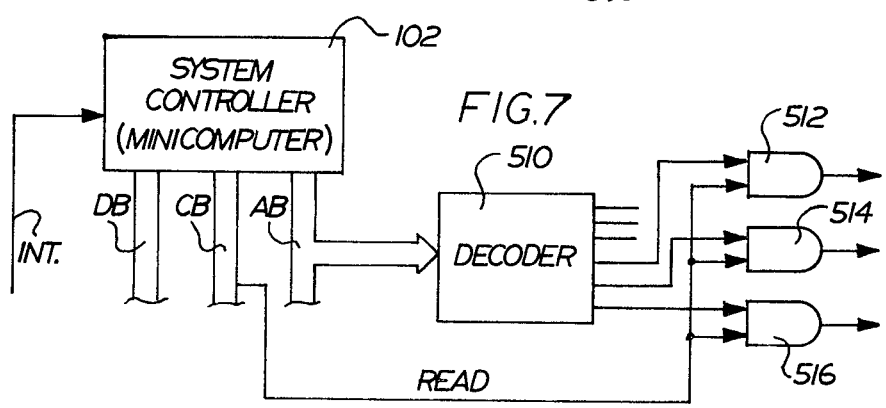
FIG. 7 is a schematic illustration of the system controller and its bus structure.

The distance manifestation will be made available to the computer by way of an input port 500. This will be done after an interrupt is supplied to the computer alerting that the information is available and, thereafter, the computer will request this data be placed on the data bus DB by way of the input port 500. The information is available for the computer after the point in time that the latch registers 480 and 482 were loaded by the signal from the OR gate 416 (FIG. 5). This signal is also employed to set a flip-flop 502 which then raises the interrupt line INT to the system controller 102 and thereby alerting it that the data is available. The system controller, as best shown in FIG. 7, will under program control determine when to request the available data. At this point the address of the data to be read will be supplied to an address bus AB and decoded by means of a decoder 510. The decoder, in turn, will enable one of two AND gates 512 and 514 which in combination provides means to select one of four different combinations of data to be passed by the input port 500. In this manner the vehicle identifications data, the height data, the distance data, and the aisle data may all be, in turn, addressed and supplied to the data bus DB from the input port once the control bus CB supplies a READ pulse to gates 512 and 514. In a similar manner, flip-flop 502 as well as the search and enable flip-flop 440 may be reset by gate 516 in the program control so that the circuitry is in condition for another cycle of operation.

The invention has been described in conjunction with a specific embodiment, it is to be appreciated that various modifications and arrangements may be made without departing from the spirit and scope of the present invention as defined by the appended claims.

What is claimed is:

1. A system for detecting path position of a load carrying vehicle adapted to travel along a path and deposit its load at an assigned location along said path, comprising:
    means carried by said vehicle for transmitting a first signal indicative that the load has been removed from the vehicle;
    means, for upon actuation, transmitting an energy beam along said path;
    receiver means at a central station responsive to said first signal for actuating said energy transmitting means;
    beam detection means carried by said vehicle for receiving a said energy beam, said vehicle carried transmitting means being coupled to said detection means and including means for transmitting a second signal indicative of the reception of said received energy beam, and
    said central station receiver means including means responsive to said second signal for determining the path position of said vehicle.

2. A system as set forth in claim 1 wherein said energy transmitting means includes a sonic transmitter for transmitting sonic signals along said path, said beam detection means includes means for detecting said sonic signal when the vehicle is located in said path.

3. A system as set forth in claim 2, wherein said central station receiver means includes means for determining the path depth of the vehicle from the sonic transmitter by timing the elapsed period between transmission of said sonic signal and reception thereof by said vehicle carried beam detection means as manifested by reception of said second signal at said central station.

4. A system as set forth in claim 3, wherein said vehicle carried transmitting means also includes means for transmitting vehicle identification information along with said load information.

5. A system as set forth in claim 4, wherein said vehicle is a lift truck having a load carrying lift movable to various load heights, means carried by said vehicle for providing lift height information for transmission along with said load and vehicle identification information.

6. A system as set forth in claim 2, wherein said vehicle carried transmitting means includes an RF transmitter for transmitting said first signal to said central station, said receiving means at said central station including RF receiver means.

7. A system as set forth in claim 1, wherein said energy transmitting means includes a sonic transmitter for transmitting sonic signals along said path, said vehicle carried beam detection means includes first and second differently directionally directed sonic detector means for supplying said second signal so as to respectively include a first component and a second component having values respectively representative of the magnitudes of sonic signals simultaneously received by said first and second sonic detector means.

8. A system as set forth in claim 7, wherein said central station includes means responsive to said first and second components of said second signal for determining therefrom the vehicle heading direction of said vehicle.

9. A system as set forth in claim 8, wherein said central station includes means for comparing the values of said first and second components to determine which of said sonic detector means received the loudest sonic signal, thereby attaining a measure of vehicle heading direction.

10. A system for detecting path position of a vehicle adapted to travel along a path to an assigned location along said path, comprising:
    first transmitter means for transmitting a first signal along said path when the position of said vehicle is to be determined;
    first receiver means carried by said vehicle for receiving a said first signal;
    second transmiter means carried by said vehicle for transmitting a second signal along said path upon receipt of said first signal by said first receiver means;
    second receiver means associated with said first transmitter means for receiving said second signal;
    at least one of said first and second transmitter means including means for transmitting a sonic signal, whereby at least one of said first and second signals comprises a sonic signal;
    means for determining the position of said vehicle along said path upon the basis of the time interval between transmission and reception of said sonic signal; and,
    said vehicle further carries means for providing an indication that the position of said vehicle is to be determined, and for causing said second transmitter means to transmit a third signal in response to said indication, and wherein said first transmitter menas is actuated to transmit said first signal when said third signal is received by said second receiving means.

11. A system as set forth in claim 10, wherein said first transmitter means comprises a sonic signal transmitter, whereby said first signal comprises a sonic signal.

12. A system as set forth in claim 10, wherein said path position determining means comprises means for providing a time interval measurement indicative of the time interval between transmission of said first signal and reception of said second signal, and means for determining said path position from said time interval measurement.

13. A system as set forth in claim 10, wherein said vehicle comprises a load carrying vehicle, and wherein said indication providing means comprises means for providing said indication upon a change in the amount of load carried by said vehicle.

* * * * *